(12) United States Patent
Shi et al.

(10) Patent No.: US 8,041,385 B2
(45) Date of Patent: Oct. 18, 2011

(54) POWER MANAGEMENT MECHANISM FOR UNLICENSED WIRELESS COMMUNICATION SYSTEMS

(75) Inventors: Jianxiong Shi, Pleasanton, CA (US); Michael D Gallagher, San Jose, CA (US); Joseph Baranowski, Morgan Hill, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 806 days.

(21) Appl. No.: 11/098,237

(22) Filed: Apr. 4, 2005

(65) Prior Publication Data

US 2005/0255879 A1 Nov. 17, 2005

Related U.S. Application Data

(60) Provisional application No. 60/571,131, filed on May 14, 2004.

(51) Int. Cl.
*H04M 1/00* (2006.01)

(52) U.S. Cl. ............... 455/552.1; 455/426.1; 455/553.1; 455/436; 455/437; 455/438; 370/328; 370/338; 370/331; 370/332

(58) Field of Classification Search ............... 455/552.1, 455/553.1, 432.1–433, 426.1, 41.2, 436–444; 370/328, 338, 331, 332
See application file for complete search history.

(56) References Cited

U.S. PATENT DOCUMENTS

| | | |
|---|---|---|
| 5,101,501 A | 3/1992 | Gilhousen et al. |
| 5,109,528 A | 4/1992 | Uddenfeldt |
| 5,226,045 A | 7/1993 | Chuang |
| 5,235,632 A | 8/1993 | Raith |
| 5,260,944 A | 11/1993 | Tomabechi |
| 5,260,988 A | 11/1993 | Schellineig et al. |
| 5,267,261 A | 11/1993 | Blakeney, II et al. |
| 5,333,175 A | 7/1994 | Ariyavisitakul |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry |

(Continued)

FOREIGN PATENT DOCUMENTS

EP 0936777 A1 8/1999

(Continued)

OTHER PUBLICATIONS

U.S. Appl. No. 10/116,023, filed Apr. 2, 2002, Mohammed, Jahangir.

(Continued)

*Primary Examiner* — Kamran Afshar
*Assistant Examiner* — Sayed T Zewari
(74) *Attorney, Agent, or Firm* — Adeli & Tollen LLP

(57) ABSTRACT

A method is disclosed. The method includes a mobile station (MS) operating on a licensed communication network via a first radio, the MS switching operation from the licensed communication network to operating on an unlicensed communication network via a second radio and deactivating the first radio upon switching operation to the unlicensed communication network.

15 Claims, 5 Drawing Sheets

U.S. PATENT DOCUMENTS

| | | | |
|---|---|---|---|
| 5,634,193 A | 5/1997 | Ghisler | |
| 5,640,414 A | 6/1997 | Blakeney, II et al. | |
| 5,659,598 A | 8/1997 | Byrne | |
| 5,659,878 A | 8/1997 | Uchida et al. | |
| 5,664,005 A | 9/1997 | Emery et al. | |
| 5,673,307 A | 9/1997 | Holland et al. | |
| 5,675,629 A | 10/1997 | Raffel et al. | |
| 5,724,658 A | 3/1998 | Hasan | |
| 5,732,076 A | 3/1998 | Ketseoglou et al. | |
| 5,745,852 A | 4/1998 | Khan et al. | |
| 5,758,281 A | 5/1998 | Emery et al. | |
| 5,796,727 A | 8/1998 | Harrison et al. | |
| 5,796,729 A | 8/1998 | Greaney et al. | |
| 5,815,525 A | 9/1998 | Smith | |
| 5,818,820 A | 10/1998 | Anderson et al. | |
| 5,822,681 A | 10/1998 | Chang et al. | |
| 5,825,759 A | 10/1998 | Liu | |
| 5,852,767 A | 12/1998 | Sugita | |
| 5,870,677 A | 2/1999 | Takahashi et al. | |
| 5,887,020 A | 3/1999 | Smith et al. | |
| 5,887,260 A | 3/1999 | Nakata | |
| 5,890,055 A | 3/1999 | Chu et al. | |
| 5,890,064 A | 3/1999 | Widergen et al. | |
| 5,903,834 A | 5/1999 | Wallstedt et al. | |
| 5,915,224 A | 6/1999 | Jonsson | |
| 5,926,760 A | 7/1999 | Khan et al. | |
| 5,936,949 A | 8/1999 | Pasternak et al. | |
| 5,940,512 A | 8/1999 | Tomoike | |
| 5,946,622 A | 8/1999 | Bojeryd | |
| 5,949,773 A | 9/1999 | Bhalla et al. | |
| 5,960,341 A | 9/1999 | LeBlanc et al. | |
| 5,960,361 A | 9/1999 | Chen | |
| 5,995,828 A | 11/1999 | Nishida | |
| 6,016,318 A | 1/2000 | Tomoike | |
| 6,035,193 A | 3/2000 | Buhrmann et al. | |
| 6,052,592 A | 4/2000 | Schellinger et al. | |
| 6,101,176 A | 8/2000 | Honkasalo | |
| 6,112,080 A | 8/2000 | Anderson et al. | |
| 6,112,088 A | 8/2000 | Haartsen | |
| 6,119,000 A | 9/2000 | Stephenson et al. | |
| 6,130,886 A | 10/2000 | Ketseoglou et al. | |
| 6,134,227 A | 10/2000 | Magana | |
| 6,138,019 A | 10/2000 | Trompower et al. | |
| 6,226,515 B1 | 5/2001 | Pauli | |
| 6,236,852 B1 | 5/2001 | Veerasamy et al. | |
| 6,243,581 B1 | 6/2001 | Jawanda | |
| 6,256,511 B1 | 7/2001 | Brown | |
| 6,263,211 B1 | 7/2001 | Brunner | |
| 6,269,086 B1 | 7/2001 | Magana et al. | |
| 6,320,873 B1 | 11/2001 | Nevo et al. | |
| 6,327,470 B1 | 12/2001 | Ostling | |
| 6,359,872 B1 | 3/2002 | Mahany et al. | |
| 6,374,102 B1 | 4/2002 | Brachman et al. | |
| 6,381,457 B1 | 4/2002 | Carlsson et al. | |
| 6,389,059 B1 | 5/2002 | Smith et al. | |
| 6,415,158 B1 | 7/2002 | King et al. | |
| 6,430,395 B2 | 8/2002 | Arazi et al. | |
| 6,438,117 B1 * | 8/2002 | Grilli et al. | 370/331 |
| 6,445,921 B1 | 9/2002 | Bell | |
| 6,463,307 B1 | 10/2002 | Larsson et al. | |
| 6,539,237 B1 | 3/2003 | Sayers et al. | |
| 6,542,516 B1 | 4/2003 | Vialen et al. | |
| 6,553,219 B1 | 4/2003 | Vilander et al. | |
| 6,556,822 B1 | 4/2003 | Matsumoto | |
| 6,556,825 B1 | 4/2003 | Mansfield | |
| 6,556,830 B1 | 4/2003 | Lenzo | |
| 6,574,266 B1 | 6/2003 | Haartsen | |
| 6,587,444 B1 | 7/2003 | Lenzo et al. | |
| 6,633,761 B1 | 10/2003 | Singhal | |
| 6,643,512 B1 | 11/2003 | Ramaswamy | |
| 6,647,426 B2 | 11/2003 | Mohammed | |
| 6,658,250 B1 | 12/2003 | Ganesan et al. | |
| 6,665,276 B1 | 12/2003 | Culbertson et al. | |
| 6,675,009 B1 | 1/2004 | Cook | |
| 6,680,923 B1 | 1/2004 | Leon | |
| 6,711,400 B1 | 3/2004 | Aura | |
| 6,766,160 B1 | 7/2004 | Lemilainen | |
| 6,788,656 B1 | 9/2004 | Smolentzov et al. | |
| 6,801,519 B1 | 10/2004 | Mangel | |
| 6,801,772 B1 | 10/2004 | Townend et al. | |
| 6,801,777 B2 | 10/2004 | Rusch | |
| 6,807,163 B1 | 10/2004 | Shi | |
| 6,807,417 B2 | 10/2004 | Sallinen | |
| 6,824,048 B1 | 11/2004 | Itabashi et al. | |
| 6,826,154 B2 | 11/2004 | Subbiah et al. | |
| 6,829,227 B1 | 12/2004 | Pitt | |
| 6,842,462 B1 | 1/2005 | Ramjee et al. | |
| 6,845,095 B2 | 1/2005 | Krishnarajah et al. | |
| 6,895,255 B1 | 5/2005 | Bridgelall | |
| 6,909,705 B1 | 6/2005 | Lee et al. | |
| 6,922,559 B2 | 7/2005 | Mohammed | |
| 6,925,074 B1 * | 8/2005 | Vikberg et al. | 370/338 |
| 6,937,862 B2 | 8/2005 | Back et al. | |
| 6,970,719 B1 | 11/2005 | McConnell et al. | |
| 7,009,952 B1 | 3/2006 | Razavilar et al. | |
| 7,146,130 B2 | 12/2006 | Hsu et al. | |
| 7,146,151 B2 | 12/2006 | Arimitsu | |
| 7,200,112 B2 | 4/2007 | Sundar et al. | |
| 7,224,970 B2 | 5/2007 | Smith et al. | |
| 7,440,755 B2 | 10/2008 | Balachandran et al. | |
| 7,515,575 B1 | 4/2009 | Shi et al. | |
| 7,555,313 B2 * | 6/2009 | Vaananen et al. | 455/557 |
| 7,580,397 B2 | 8/2009 | Arai et al. | |
| 7,613,171 B2 | 11/2009 | Zehavi et al. | |
| 7,636,336 B2 | 12/2009 | Forte et al. | |
| 7,657,262 B2 | 2/2010 | Grayson | |
| 7,904,084 B2 | 3/2011 | Shi et al. | |
| 2001/0029186 A1 | 10/2001 | Canyon et al. | |
| 2001/0031645 A1 | 10/2001 | Jarrett | |
| 2001/0046860 A1 | 11/2001 | Lee | |
| 2001/0049790 A1 | 12/2001 | Faccin et al. | |
| 2002/0045459 A1 | 4/2002 | Morikawa | |
| 2002/0066036 A1 | 5/2002 | Makineni | |
| 2002/0075844 A1 | 6/2002 | Hagen | |
| 2002/0082015 A1 | 6/2002 | Wu | |
| 2002/0085516 A1 | 7/2002 | Bridgelall | |
| 2002/0102974 A1 | 8/2002 | Raith | |
| 2002/0118674 A1 | 8/2002 | Faccin et al. | |
| 2002/0131387 A1 | 9/2002 | Pitcher et al. | |
| 2002/0132630 A1 | 9/2002 | Arazi et al. | |
| 2002/0142761 A1 | 10/2002 | Wallstedt et al. | |
| 2002/0147008 A1 | 10/2002 | Kallio | |
| 2002/0147016 A1 | 10/2002 | Arazi et al. | |
| 2002/0155829 A1 | 10/2002 | Proctor, Jr. et al. | |
| 2002/0160811 A1 | 10/2002 | Jannette et al. | |
| 2002/0166068 A1 | 11/2002 | Kilgore | |
| 2002/0168959 A1 | 11/2002 | Noguchi et al. | |
| 2002/0187780 A1 | 12/2002 | Souissi | |
| 2002/0191575 A1 | 12/2002 | Kalavade et al. | |
| 2002/0197984 A1 | 12/2002 | Monin et al. | |
| 2003/0007475 A1 | 1/2003 | Tsuda et al. | |
| 2003/0031151 A1 | 2/2003 | Sharma et al. | |
| 2003/0043773 A1 | 3/2003 | Chang | |
| 2003/0087653 A1 | 5/2003 | Leung | |
| 2003/0112789 A1 | 6/2003 | Heinonen | |
| 2003/0119480 A1 | 6/2003 | Mohammed | |
| 2003/0119490 A1 | 6/2003 | Mohammed | |
| 2003/0119527 A1 | 6/2003 | Labun | |
| 2003/0119548 A1 * | 6/2003 | Mohammed | 455/552 |
| 2003/0130008 A1 | 7/2003 | Rajaniemi et al. | |
| 2003/0139180 A1 | 7/2003 | McIntosh et al. | |
| 2003/0139184 A1 * | 7/2003 | Singh et al. | 455/436 |
| 2003/0142673 A1 | 7/2003 | Patil | |
| 2003/0176186 A1 | 9/2003 | Mohammed | |
| 2003/0193952 A1 | 10/2003 | O'Neill | |
| 2003/0210199 A1 | 11/2003 | Sward et al. | |
| 2003/0219024 A1 | 11/2003 | Purnadi et al. | |
| 2004/0008649 A1 | 1/2004 | Wybenga | |
| 2004/0009749 A1 | 1/2004 | Arazi et al. | |
| 2004/0013099 A1 | 1/2004 | O'Neill | |
| 2004/0037312 A1 | 2/2004 | Spear | |
| 2004/0053623 A1 | 3/2004 | Hoff et al. | |
| 2004/0068571 A1 | 4/2004 | Ahmavaara | |
| 2004/0077355 A1 | 4/2004 | Krenik et al. | |
| 2004/0077356 A1 | 4/2004 | Krenik et al. | |
| 2004/0077374 A1 | 6/2004 | Terry | |
| 2004/0116120 A1 | 6/2004 | Mohammed et al. | |

| | | | |
|---|---|---|---|
| 2004/0147223 A1 | 9/2004 | Cho | |
| 2004/0171378 A1 | 9/2004 | Rautila | |
| 2004/0192211 A1 | 10/2004 | Gallagher et al. | |
| 2004/0202132 A1 | 10/2004 | Heinonen | |
| 2004/0203346 A1 | 10/2004 | Myhre et al. | |
| 2004/0203737 A1 | 10/2004 | Myhre et al. | |
| 2004/0203745 A1 | 10/2004 | Cooper | |
| 2004/0203800 A1 | 10/2004 | Myhre et al. | |
| 2004/0203815 A1 | 10/2004 | Shoemake et al. | |
| 2005/0272424 A1 | 2/2005 | Gallagher | |
| 2005/0064896 A1 | 3/2005 | Rautiola et al. | |
| 2005/0101245 A1 | 5/2005 | Ahmavaara | |
| 2005/0101329 A1 | 5/2005 | Gallagher | |
| 2005/0181805 A1 | 8/2005 | Gallagher | |
| 2005/0186948 A1 | 8/2005 | Gallagher | |
| 2005/0198199 A1 | 9/2005 | Dowling | |
| 2005/0207395 A1 | 9/2005 | Mohammed | |
| 2005/0255879 A1 | 11/2005 | Shi | |
| 2005/0265279 A1 | 12/2005 | Markovic | |
| 2005/0266853 A1 | 12/2005 | Gallagher | |
| 2005/0271008 A1 | 12/2005 | Gallagher | |
| 2005/0272449 A1 | 12/2005 | Gallagher | |
| 2006/0009201 A1 | 1/2006 | Gallagher | |
| 2006/0009202 A1 | 1/2006 | Gallagher | |
| 2006/0014537 A1 | 1/2006 | Arai et al. | |
| 2006/0019656 A1 | 1/2006 | Gallagher | |
| 2006/0019657 A1 | 1/2006 | Gallagher | |
| 2006/0019658 A1 | 1/2006 | Gallagher | |
| 2006/0025143 A1 | 2/2006 | Gallagher | |
| 2006/0025144 A1 | 2/2006 | Gallagher | |
| 2006/0025145 A1 | 2/2006 | Gallagher | |
| 2006/0025146 A1 | 2/2006 | Gallagher | |
| 2006/0025147 A1 | 2/2006 | Gallagher | |
| 2006/0035636 A1 | 2/2006 | Pirila | |
| 2006/0079258 A1 | 4/2006 | Gallagher | |
| 2006/0079259 A1 | 4/2006 | Gallagher | |
| 2006/0079273 A1 | 4/2006 | Gallagher | |
| 2006/0079274 A1 | 4/2006 | Gallagher | |
| 2006/0098598 A1 | 5/2006 | Gallagher | |
| 2006/0203784 A1 | 9/2006 | Cromer et al. | |
| 2007/0008941 A1 | 1/2007 | Narasimha et al. | |
| 2007/0060125 A1 | 3/2007 | Rahim | |
| 2007/0293222 A1 | 12/2007 | Vikberg et al. | |
| 2009/0323572 A1 | 12/2009 | Shi et al. | |

FOREIGN PATENT DOCUMENTS

| | | |
|---|---|---|
| EP | 1 207 708 A1 | 5/2002 |
| EP | 1207708 B1 | 10/2004 |
| GB | 2282735 A | 4/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 02/45456 A1 | 6/2002 |
| WO | WO 03039009 A2 | 5/2003 |
| WO | WO 03039009 A3 | 5/2003 |
| WO | 03092312 A1 | 11/2003 |
| WO | WO 2004002051 A2 | 12/2003 |
| WO | WO 2004/036770 A2 | 4/2004 |
| WO | WO 2004034219 A2 | 4/2004 |
| WO | WO 2004039111 A1 | 5/2004 |
| WO | WO 2005006597 A1 | 1/2005 |
| WO | WO 2005/055633 A2 | 6/2005 |
| WO | WO 2005107169 A1 | 11/2005 |
| WO | WO 2005107297 A1 | 11/2005 |
| WO | WO 2005/114917 | 12/2005 |
| WO | PCT/US2005/040689 | 3/2006 |
| WO | WO 2005114918 A3 | 3/2006 |

OTHER PUBLICATIONS

U.S. Appl. No. 11/004,439, filed Dec. 3, 2004, Gallagher, Michael.
U.S. Appl. No. 11/225,398, filed Sep. 12, 2005, Gallagher, Michael.
U.S. Appl. No. 11/225,871, filed Sep. 12, 2005, Gallagher, Michael.
U.S. Appl. No. 11/225,872, filed Sep. 12, 2005, Gallagher, Michael.
U.S. Appl. No. 11/226,610, filed Sep. 13, 2005, Gallagher, Michael.
U.S. Appl. No. 11/226,617, filed Sep. 13, 2005, Gallagher, Michael.
U.S. Appl. No. 11/227,573, filed Sep. 14, 2005, Gallagher, Michael.
U.S. Appl. No. 11/227,784, filed Sep. 14, 2005, Gallagher, Michael.
U.S. Appl. No. 11/227,840, filed Sep. 14, 2005, Gallagher, Michael.
U.S. Appl. No. 11/225,870, filed Sep. 12, 2005, Gallagher, Michael.
U.S. Appl. No. 11/227,842, filed Sep. 14, 2005, Gallagher, Michael.
U.S. Appl. No. 11/228,853, filed Sep. 15, 2005, Gallagher, Michael.
U.S. Appl. No. 11/229,470, filed Sep. 15, 2005, Gallagher, Michael.
PCT Search Report, PCT/US2005/016670, mailed Aug. 11, 2005.
U.S. Appl. No. 10/116,311 (Non-Final Office Action mailed: Feb. 9, 2006), filed Apr. 2, 2002, Jahangir Mohammed.
U.S. Appl. No. 10/115,767 (Non-Final Office Action mailed: Dec. 22, 2005), filed Apr. 2, 2002, Jahangir Mohammed.
U.S. Appl. No. 10/115,835 (Non-Final Office Action mailed: Jul. 25, 2005), filed Apr. 2, 2002, Jahangir Mohammed.
U.S. Appl. No. 10/116,186 (Final Office Action mailed: Feb. 1, 2006), filed Apr. 2, 2002, Jahangir Mohammed.
U.S. Appl. No. 10/251,901 (Non-Final Office Action, filed Sep. 20, 2002, Michael D. Gallagher.
U.S. Appl. No. 10/688,470 (Non-Final Office Action mailed: Dec. 15, 2005), filed Oct. 17, 2003, Michael D. Gallagher.
U.S. Appl. No. 11/004,439 (Non-Final Office Action mailed: Sep. 21, 2005), filed Dec. 3, 2004, Michael D. Gallagher.
*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.
Claus Lindholt Hansen et al., "Mobile@Home—a New Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C. et al., "Intelligent Handoff for Mobile Wireless Internet," *Mobile Networks and Applications*, 6, 2001 Kluwer Academic Publishers, Manufactured in the Netherlands (2001) 67-79.
"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunication Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
U.S. Appl. No. 11/212,353, filed Aug. 26, 2005, Shi, Jianxiong.
Non-Final Office Action of U.S. Appl. No. 11/212,353, May 21, 2008 (mailing date), Shi, Jianxiong.
Non-Final Office Action of U.S. Appl. No. 10/116,311, May 12, 2008 (mailing date), Mohammed, Jahangir.
U.S. Appl. No. 12/502,207, filed Jul. 13, 2009, Mohammed, Jahangir.
Updated portions of prosecution history of U.S. Appl. No. 10/116,311, Apr. 13, 2009, Mohammed, Jahangir.
Updated portions of prosecution history of U.S. Appl. No. 11/212,353, Feb. 4, 2009, Shi, Jianxiong, et al.
Written Opinion for PCT/US2005/016670, Aug. 9, 2005 (mailing date), Kineto Wireless, Inc.
International Preliminary Report on Patentability for PCT/US2005/016670, Nov. 14, 2006 (Issuance date), Kineto Wireless, Inc.
Portions of prosecution history of U.S. Appl. No. 12/381,903, Jul. 23, 2010, Shi, Jianxiong, et al.
Updated portions of prosecution history of U.S. Appl. No. 11/212,353, Feb. 11, 2009, Shi, Jianxiong, et al.
Updated portions of prosecution history of U.S. Appl. No. 12/381,903, Jan. 6, 2011, Shi, Jianxiong, et al.

* cited by examiner

POWER MANAGEMENT MECHANISM FOR UNLICENSED WIRELESS COMMUNICATION SYSTEMS

The present application is a non-provisional application and claims priority of provisional application No. 60/571,131, filed May 14, 2004, entitled "GSM RR Hibernate Mode Proposal"

FIELD OF THE INVENTION

This invention relates generally to telecommunications. More particularly, this invention relates to a technique for seamlessly integrating voice and data telecommunication services across a licensed wireless system and an unlicensed wireless system.

BACKGROUND

Currently, licensed and unlicensed wireless communication systems are deployed to enhance customer premises coverage, increasing network capacity. By deploying such a system, wireless service providers enable subscribers to roam and handover between cellular networks and public and private unlicensed wireless networks using dual-mode mobile handsets. However, various issues remain prevalent in integrating licensed and unlicensed communication systems.

One such issue is the management of power in the dual-mode mobile handset operating on both a licensed and unlicensed wireless networks. For instance, when a mobile handset switches from a licensed network to an unlicensed network, radios within the mobile handset associated with each system remain on. This is the case regardless of the fact that there is no active communication between the mobile handset and the licensed network. Having two active radios results in reduced battery life for the mobile handset.

SUMMARY

In one embodiment, a method is described. The method includes a mobile station (MS) operating on a licensed communication network via a first radio, the MS switching operation from the licensed communication network to operating on an unlicensed communication network via a second radio and deactivating the first radio upon switching operation to the unlicensed communication network. In a further embodiment, the MS detaches a radio resource (RR) sub-layer associated with the licensed communication network and shuts down a layer 1 protocol layer associated with the licensed communication network prior to deactivating the first radio.

BRIEF DESCRIPTION OF THE DRAWINGS

The invention is more fully appreciated in connection with the following detailed description taken in conjunction with the accompanying drawings, in which like reference numerals refer to corresponding parts throughout the several views of the drawings.

DETAILED DESCRIPTION

The present invention is directed towards a mechanism for reducing power while a mobile station is in communication with an unlicensed communication system. According to one embodiment, a mobile station (MS) goes into a hibernation mode after the MS has switched operation from a licensed communication network to operating on an unlicensed communication network. In the hibernation mode a radio associated with the licensed communication network is deactivated.

In one embodiment, the unlicensed wireless system is a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer.

Throughout the following description, acronyms commonly used in the telecommunications industry for wireless services are utilized along with acronyms specific to the present invention.

Figure 1A:
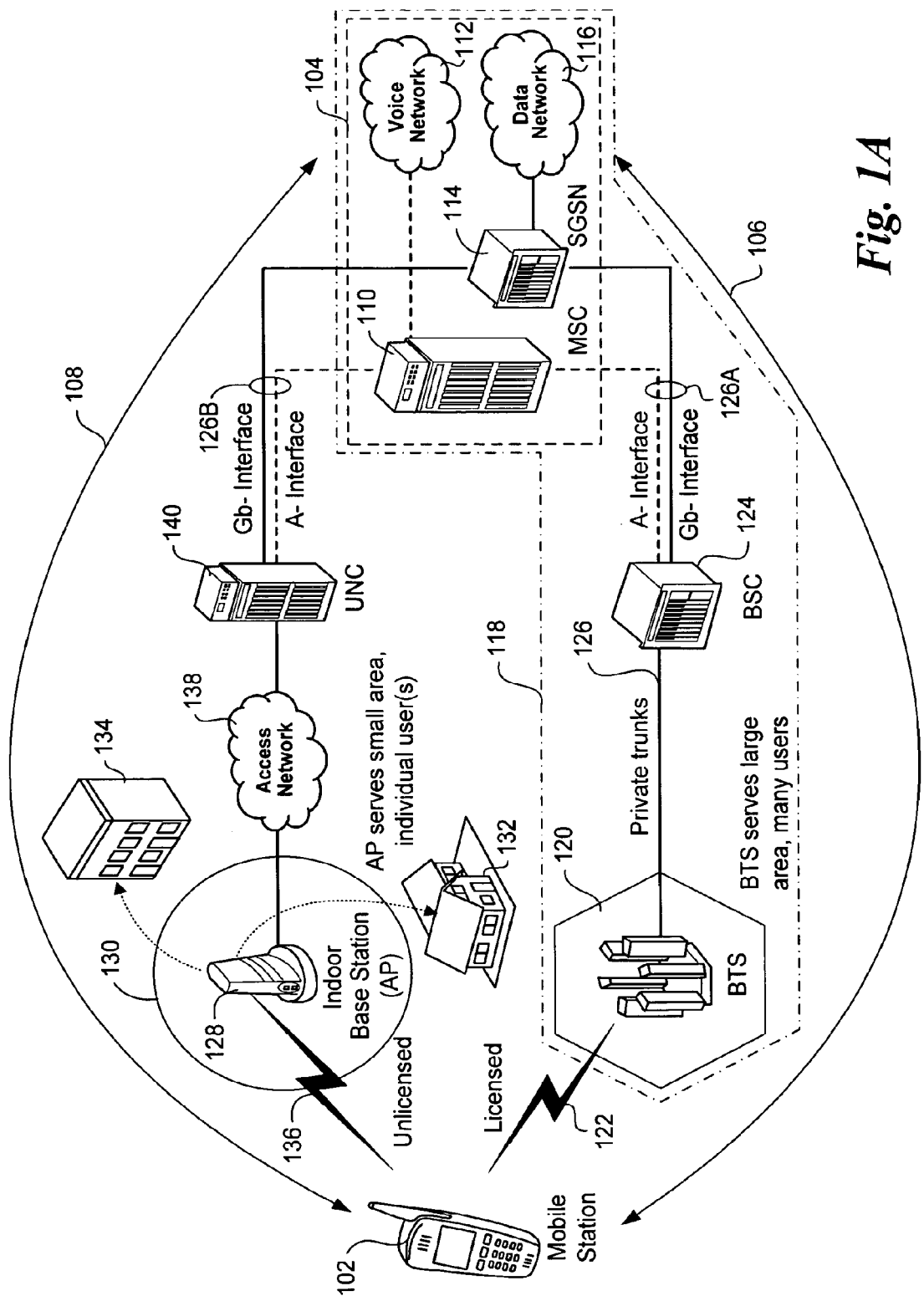
FIG. 1A provides an overview of the indoor access network (IAN) mobile service solution in accordance with one embodiment of the present invention.

FIG. 1A illustrates an Unlicensed Mobile Access (UMA) architecture 100 in accordance with one embodiment of the present invention. UMA architecture 100 enables a user of a mobile station 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function, as explained in further detail below.

In further detail, the licensed wireless communication session is facilitated by infrastructure provided by a licensed wireless network 118 that includes telecommunications network 104. In the illustrated embodiment, licensed wireless network 118 depicts components common to a GSM—(Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

An unlicensed communication session 108 is facilitated via an (wireless) access point (AP) 128 comprising an indoor base station 130. Typically, AP 128 will be located in a fixed structure, such as a home 132 or an office building 134. In one embodiment, the service area of indoor base station 130 includes an indoor portion of a building, although it will be understood that the service area of an indoor base station may include an outdoor portion of a building or campus. As indicated by the arrow representing unlicensed communication session 108, the mobile station 102 may be connected to the telecommunications network 114 via a second data path that includes an unlicensed wireless channel 136, access point 128, an access network 138, and an unlicensed mobile access network controller (UNC) 140. The UNC 140 communicates with telecommunications network 104 using a base station controller interface 126B that is similar to base station controller interface 126A, and includes a GSM A interface and Gb interface. As described below in more detail, indoor base station 128 and indoor network controller 132 may include software entities stored in memory and executing on one or more microprocessors (not shown in FIG. 1A) adapted to perform protocol conversion.

As described below in more detail, indoor base station 128 and UMA network controller 140 may include software entities stored in memory and executing on one or more microprocessors (not shown in FIG. 1A) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

Figure 1B:
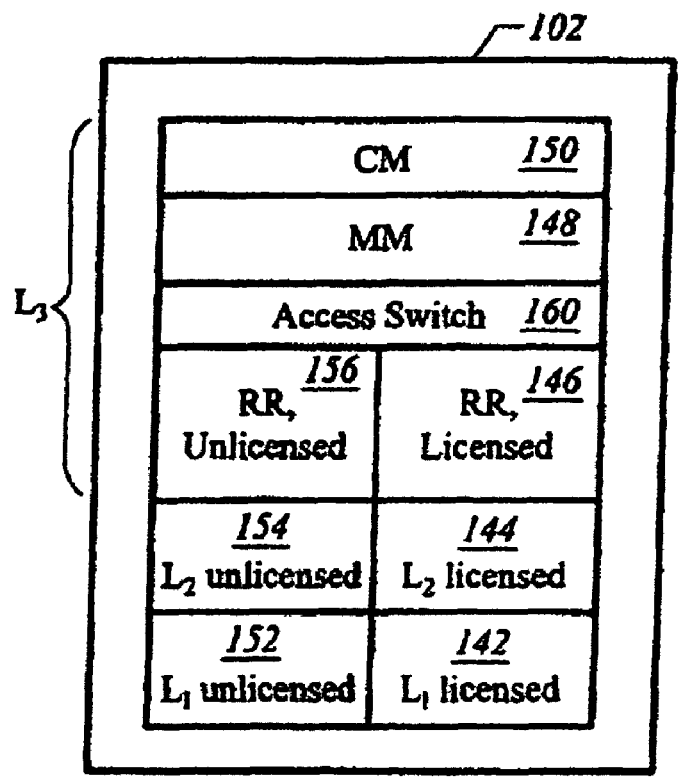
FIG. 1B illustrates protocol layers of a mobile set in accordance with one embodiment.

In one embodiment, mobile station 102 includes a microprocessor and memory (not shown) that stores computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR sublayer is concerned with the management of an RR-session, which is the time that a mobile station is in a dedicated mode, as well as the configuration of radio channel, power controller, discontinuous transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

In one embodiment of the present invention, the mobile station also includes an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed AP 128 and to support switching between licensed RR sublayer 146 and unlicensed wireless service RR sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems, as described below in more detail.

Figure 1C:
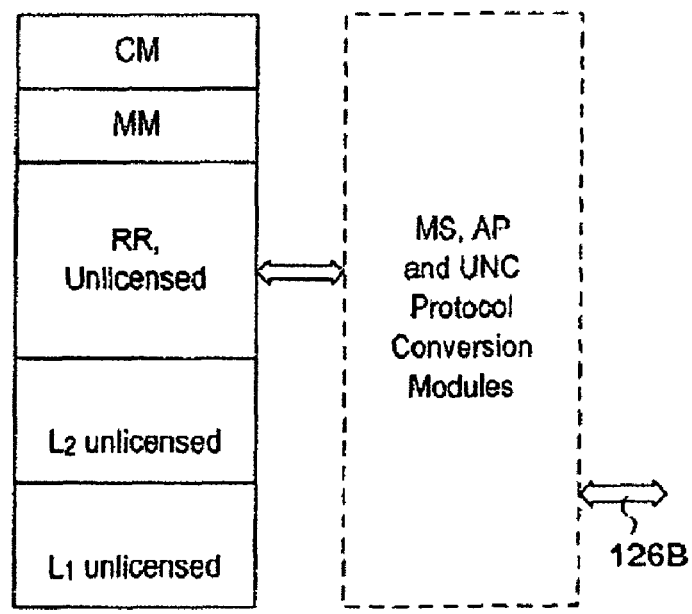
FIG. 1C illustrates a method of protocol interworking in accordance with one embodiment.

Referring to FIG. 1C, in one embodiment of the present invention, the mobile station 102, AP 128 and UNC 140 provide an interworking function between the level 1, level 2, and level 3 layers of the unlicensed service into a conventional base station subnetwork (BSS) interface 126B (e.g., an A-interface or a Gb-interface). As a result of the protocol conversion, a communication session may be established that is transparent to the voice network/data network 104, i.e., the voice/data network 104 uses its standard interface and protocols for the communication session as it would with a conventional communication session handled by a conventional base transceiver station. For example, in some embodiments the mobile station 102 and UNC 140 are configured to initiate and forward location update and service requests. As a result, protocols for a seamless handoff of services that is transparent to voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 126 for a voice/data network 104. In one embodiment, the licensed wireless service is a GSM/GPRS radio access network, although it will be understood that embodiments of the present invention include other licensed wireless services. For this embodiment, the UNC 140 interconnects to the GSM core network via the same base station controller interfaces 126 used by a standard GSM BSS network element. For example, in a GSM application, these interfaces are the GSM A-interface for circuit switched voice services and the GSM Gb interface for packet data services (GPRS). In a UMTS (Universal Mobile Telecommunications System) application of the invention, the UNC 140 interconnects to the UMTS network using a UMTS Iu-cs interface for circuit switched voice services and the UMTS Iu-ps interface for packet data services. In a CDMA application of the invention, the UNC 140 interconnects with the CDMA network using the CDMA A1 and A2 interfaces for circuit switched voice services and the CDMA A10 and A11 interfaces for packet data services.

In a GSM/GPRS embodiment, UNC 140 appears to the GSM/GPRS core network as a GSM BSS network element and is managed and operated as such. In this architecture the principle elements of transaction control (e.g., call processing) are provided by higher network elements; namely the MSC 110 visitor location register (VLR) and the SGSN 114. Authorized mobile stations are allowed access to the GSM/GPRS core network either directly through the GSM radio access network if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the GSM case, this typically includes the following basic services: Telephony; Emergency call (e.g., E911 calling in North America); Short message, mobile-terminated point-to-point (MT/PP); Short message, mobile-originated point-to-point (MO/PP); GPRS bearer services. Additionally, GSM may also support, various supplementary services that are well-known in the art.

Figure 2:
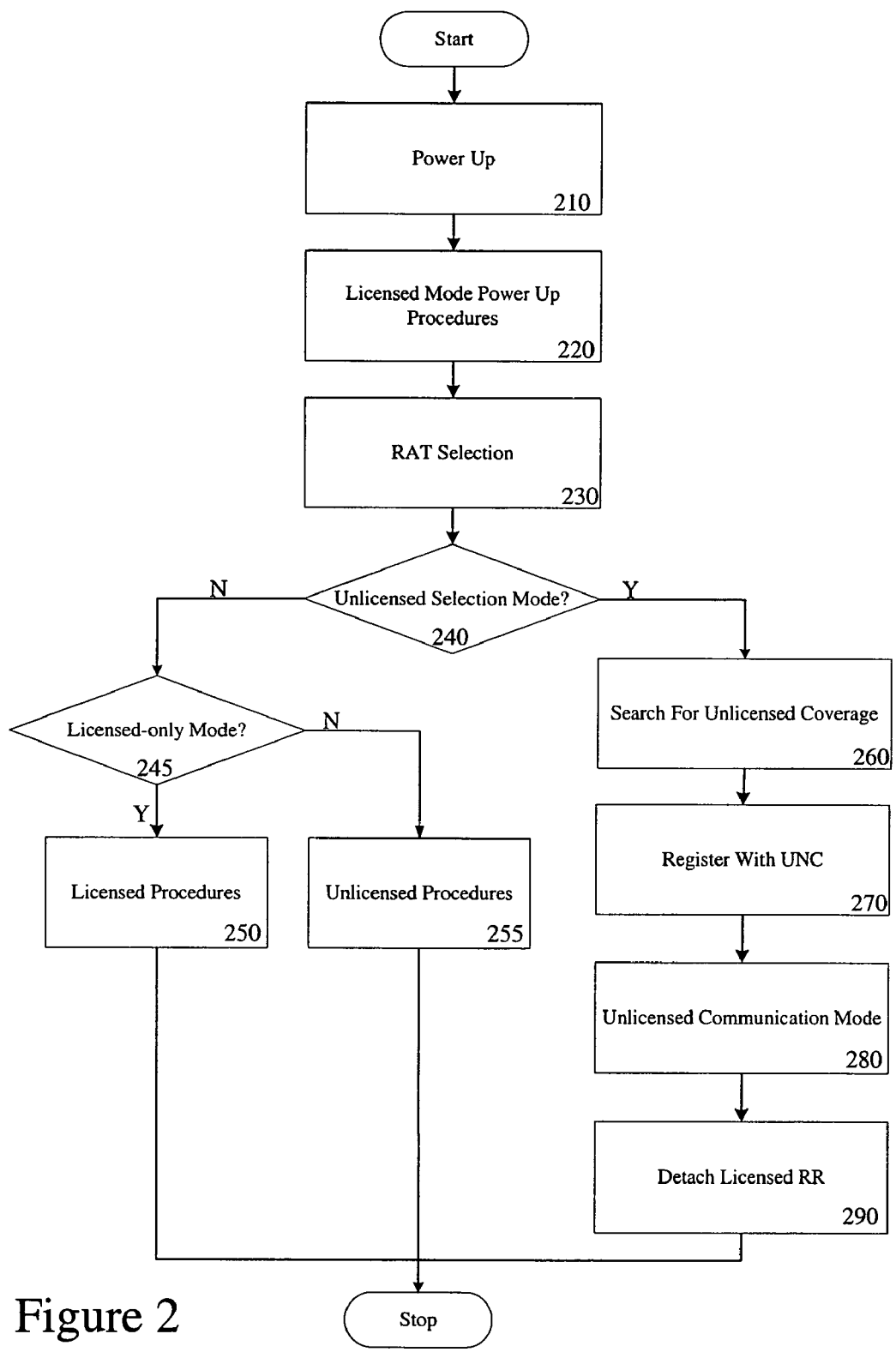
FIG. 2 is a flow diagram illustrating one embodiment of a power up sequence for a mobile station.

FIG. 2 is a flow diagram illustrating one embodiment of a power up sequence for a MS 102. At processing block 210, MS 102 is powered up. At processing block 220, MS enters a licensed communication mode. For example, MS 102 starts in a GSM mode and executes a typical GSM power up sequence, including searching for a public land mobile network (PLMN). Once the search has been completed, MS 102 is in one of three states. These states include a Normal Service state (e.g., on Home or Visiting PLMN), a Limited Service state, or No Service state (e.g., no PLMN found).

At processing block 230, radio access technology (RAT) mode selection is performed at MS 102. In one embodiment, the RAT mode selection is based on predetermined user and service provider constraints. The RAT modes include Unlicensed-only, Unlicensed-preferred, Licensed-only and Licensed-preferred. Unlicensed-only RAT mode indicates that MS 102 is to connect only to an unlicensed communication system.

Unlicensed-preferred RAT mode indicates that MS 102 is to connect to an unlicensed communication system if available, otherwise connect via a licensed communication system. Licensed-only RAT mode indicates that MS 102 is to connect only to a licensed communication system, while Licensed-preferred RAT mode indicates that MS 102 is to connect to a licensed communication system if available.

At decision block 240, it is determined whether MS 102 is operating in an Unlicensed RAT mode (e.g., Unlicensed-only or Unlicensed-preferred). At decision block 245, it is determined whether MS 102 is operating in an Licensed-only mode if not operating in an Unlicensed RAT mode. If operating in a Licensed-only RAT mode, MS 102 completes the power up sequence based upon normal licensed communication (e.g., GSM) procedures, processing block 250. However if MS 102 is operating in a Licensed-preferred RAT mode, and is in a Limited Service state or No Service state, MS 102 executes the procedures for the Unlicensed RAT mode, discussed below, processing block 255.

If operating in an Unlicensed-preferred RAT mode, MS 102 searches for coverage on an unlicensed network, processing block 260. At processing block 270, MS 102 registers with UNC 132. Note that for rove-in the Unlicensed-preferred RAT mode, MS 102 stays in a licensed communication mode until registration with UNC 132. For hand-in, MS 102 stays in licensed mode until the call has been handed over to UNC 132. At processing block 280, MS 102 switches to an unlicensed communication mode. At processing block 290, radio resource (RR) Licensed sublayer 146 is detached from the upper layers.

For operation in the Unlicensed-only RAT mode the operation is similar to that described above with respect to the Unlicensed-preferred RAT mode. However, processing blocks 260 and 280 occur simultaneously (e.g., MS 102 switches to the unlicensed communication mode at the same time the search for the unlicensed network is triggered).

Figure 3:
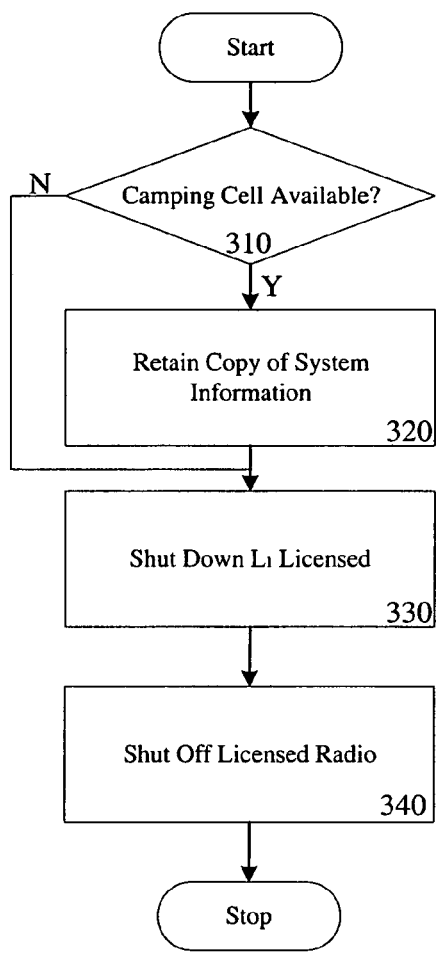
FIG. 3 is a flow diagram illustrating one embodiment of a mobile station entering a hibernate mode.

According to one embodiment, RR Licensed sublayer 146 is detached whenever MS 102 is operating in the unlicensed communication mode. As a result, MS 102 operates in either a hibernation mode or a detached cell reselection mode. In the hibernation mode, RR Licensed sublayer 146 shuts off the licensed radio in order to preserve battery life. FIG. 3 is a flow diagram illustrating one embodiment of MS 102 entering a hibernate mode.

At decision block 310, it is determined whether a licensed camping cell is available. If a camping cell is available, RR Licensed sublayer 146 stores a copy of the most recent information of the camping cell, processing block 320. At processing block 330, RR Licensed sublayer 146 shuts down $L_1$ Licensed layer 142. At processing block 340, RR Licensed sublayer 146 shuts off the licensed radio. If no camping cell is available, the process proceeds directly to processing block 330 where $L_1$ Licensed layer 142 is shut down. According to one embodiment, RR Licensed sublayer 146 exits out of the hibernation mode under two conditions. The first condition occurs when MS 102 changes access points as a result of roving or handover. The second condition occurs when a rove-out or handover-out is anticipated, either because of unlicensed radio link condition has deteriorated to a certain level or because of other reason not directly related to unlicensed radio link condition.

Figure 4:
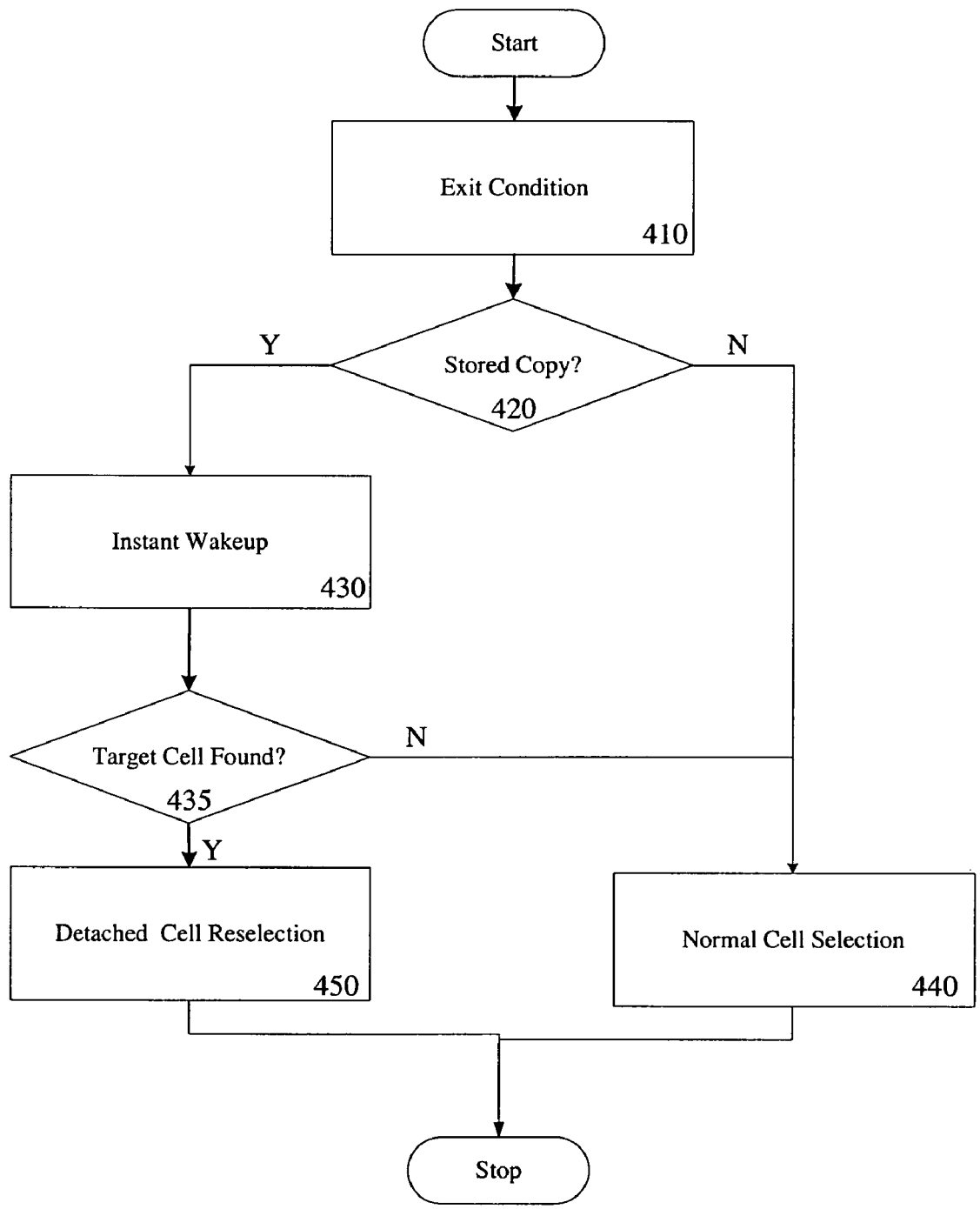
FIG. 4 is a flow diagram illustrating one embodiment of a mobile station exiting a hibernate mode.

FIG. 4 is a flow diagram illustrating one embodiment of MS 102 exiting the hibernation mode. At processing block 410, an exiting condition occurs. At decision block 420, it is whether RR Licensed sublayer 146 has a stored copy of the system information. If so, RR Licensed sublayer 146 performs an instant wakeup, processing block 430.

For instant wakeup, MS 102 tunes to the Absolute Radio Frequency Channel Number (ARFCN) of the target cell and searches for the frequency correction channel (FCCH) and synchronization channel (SCH). Once capturing the synchronization to the FCCH/SCH of the target cell MS 102 restores all system information previously stored before going into hibernation, assuming the system information is updated. At decision block 435, it is determined whether the target cell was found. RR Licensed sublayer 146 moves into the detached cell reselection mode at processing block 450, described in detail below, if the target cell is found. If sublayer 146 does not have a stored copy of the system information, or a target cell is not found within two FCCH cycles, normal licensed cell selection is initiated, processing block 440.

Note that if MS 102 is still in the unlicensed communication mode (e.g., due to unlicensed roving or handover) RR Licensed sublayer 146 may re-enter the hibernation mode. However, if switched to the licensed communication mode, RR Licensed sublayer 146 turns on the licensed radio and reopens $L_1$ Licensed layer 142.

In the detached cell reselection mode, RR Licensed sublayer 146 performs traditional cell selection/reselection procedures. However, since RR Licensed sublayer 146 is detached from access switch 160 and not servicing upper layers, RR Licensed sublayer 146 does not inform MM 148 of the selection of a new cell and/or the change of system information of the current camping cell. Further, the detection of a newly found PLMN will not trigger MM 148 to change the selected PLMN.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices.

Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method comprising:
   operating a mobile station (MS) on a licensed communication network via a first radio;
   determining whether a camping cell associated with the licensed communication network is available;
   when a camping cell associated with the licensed communication network is available, at the MS, storing system information of the camping cell;
   switching the MS from operating on the licensed communication network to operating on an unlicensed communication network via a second radio;
   detaching, at the MS, a radio resource (RR) protocol sub-layer associated with the licensed communication network from a plurality of upper protocol layers;
   at the MS, shutting down a layer 1 protocol layer associated with the licensed communication network prior to deactivating the first radio; and
   deactivating the first radio after the MS has switched operation to the unlicensed communication network.

2. The method of claim 1 further comprising detecting a condition.

3. The method of claim 2 wherein the condition occurs when the MS changes access points as a result of roving or handover.

4. The method of claim 2 wherein the condition occurs when the MS detects that rove-out or handover-out is necessary due to deterioration of unlicensed radio link condition.

5. The method of claim 2 wherein the condition occurs when the MS detects that rove-out or handover-out is necessary due to other conditions not directly related to unlicensed radio link condition.

6. The method of claim 2 further comprising activating the RR protocol sub-layer associated with the licensed communication network in response to detecting the condition.

7. The method of claim 6 further comprising restoring previously stored system information after a frequency/time synchronization is done.

8. The method of claim 6 further comprising activating the first radio.

9. A mobile station (MS) comprising:
   a licensed component comprising a licensed radio, a layer 1 protocol layer, and a radio resource (RR) licensed sub-layer to operate on a licensed network; and
   an unlicensed component to operate on an unlicensed network, wherein the licensed component is deactivated whenever the MS has switched operation to the unlicensed network, said deactivation comprising the MS detaching the RR licensed sub-layer from a plurality of upper protocol layers and deactivating the licensed radio, wherein the layer 1 protocol layer is shut off and the RR licensed sub-layer is detached prior to deactivating the licensed radio.

10. A system comprising:
    a licensed network;
    an unlicensed network; and
    a mobile station (MS) including:
       a licensed component comprising a licensed radio and a radio resource (RR) licensed sub-layer to operate on the licensed network; and
       an unlicensed component to operate on the unlicensed network, wherein the licensed component is deactivated whenever the MS has switched operation to the unlicensed network, said deactivation comprising the MS detaching the RR licensed sub-layer from a plurality of upper protocol layers and deactivating the licensed radio, wherein the RR licensed sub-layer is detached prior to deactivating the licensed radio.

11. A method comprising:
deactivating, at a mobile station (MS), a licensed radio after the MS has switched operation from a licensed communication network to an unlicensed communication network;
detecting a condition by the MS for reactivating the licensed radio;
determining whether the MS has stored a copy of information of a camping cell prior to deactivating the licensed radio;
when the MS has stored the information of the camping cell, the MS performs an instant wakeup comprising:
   tuning to an absolute radio frequency channel number (ARFCN) of a target cell;
   searching for a frequency correction channel (FCCH) and a synchronization channel (SCH) of the target cell;
   determining whether the MS has synchronized to the FCCH and SCH of the target cell; and
   restoring the information the MS stored prior to deactivating the licensed radio;
determining whether the target cell is found;
when the target cell is found, the MS moving a radio resource protocol sub-layer into a detached cell reselection mode; and
when the target cell is not found, the MS initiating normal licensed cell selection procedures.

12. The method of claim 11, wherein the detached cell reselection mode comprises a radio resource (RR) licensed sub-layer performing traditional cell selection and cell reselection procedures, wherein the RR licensed sub-layer is detached from an access mode switch and not servicing a set of protocol layers above the RR licensed sub-layer.

13. The method of claim 12, wherein the RR licensed sub-layer is not informing a mobility management (MM) protocol layer of selection of a new cell or a change of system information of a current camping cell.

14. The method of claim 11, wherein the MS continues to operate in the unlicensed communication network via the unlicensed radio after performing the instant wakeup.

15. The method of claim 11, wherein when the MS has not stored the information of the camping cell, the MS initiating normal licensed cell selection procedures.

* * * * *